United States Patent

[11] 3,615,317

| [72] | Inventors | Robert F. Jagodzinski<br>Maumee;<br>Fred E. Mansur, Toledo, both of Ohio |
|---|---|---|
| [21] | Appl. No. | 657,487 |
| [22] | Filed | Aug. 1, 1967 |
| [45] | Patented | Oct. 26, 1971 |
| [73] | Assignee | Owens-Illinois, Inc. |

[54] GLASS AND GLASS-CERAMIC TREATING PROCESS
6 Claims, No Drawings

[52] U.S. Cl. ........................................... 65/30, 65/33, 65/60, 109/39
[51] Int. Cl. .......................................... C03c 15/00, C03c 29/00
[50] Field of Search ................................ 65/33, 30, 60; 106/39

[56] References Cited
UNITED STATES PATENTS

| 2,515,937 | 7/1950 | Stookey | 65/33 X |
| 2,971,853 | 2/1961 | Stookey | 65/33 X |
| 2,515,940 | 7/1950 | Stookey | 65/33 X |
| 3,146,114 | 8/1964 | Kivighn | 65/33 X |
| 3,148,994 | 9/1964 | Voss | 65/33 X |
| 3,161,528 | 12/1964 | Eppler | 65/33 X |
| 3,282,770 | 11/1966 | Stookey et al. | 161/1 |
| 3,445,209 | 5/1969 | Asunmaa | 65/30 X |
| 3,464,807 | 9/1969 | Pressau | 65/30 X |
| 3,454,386 | 7/1969 | Ernsberger | 65/33 |
| 3,480,459 | 11/1969 | Asunmaa et al. | 65/30 |

OTHER REFERENCES

" Infrared Study of Compounds and Solide Solutions in the System Lithia-Alumina-Silica" by M. Krishna Murthy and Elizabeth M. Kirby April 26, 1961, pages 324 and 325.

" Phase Separation Induced by Platinum in Sodium Phosphate Melts by Rindone and Ryder, Jan. 1957, Class 65-33 pages 29 to 31 and 51.

" Influence of Platinum Nucleation on Crystallization of a Lithium Silicate Glass" by Guy E. Rindone, Jan. 1958, page 41 & 42, Class 65-33

The Detection and Measurement of Infra-red Radiation by R. A. Smith and E. E. Jones and R. P. Chasmar 1957 Oxford at The Charedon Press Infrared Study of Compounds and Solid Solutions Murthy and Kirly.

Primary Examiner—Frank W. Miga
Attorneys—Donald R. Bahr and W. A. Schaich

ABSTRACT: A process for producing opaque surface crystallized glass bodies, for crystallizing glass to glass-ceramics, and for further crystallizing surface portions of transparent glass-ceramics to opaque glass-ceramics by use of high-intensity infrared radiation.

The invention also includes glass or glass-ceramic bodies wherein the surface of a transparent glass-ceramic is crystallized to a different degree than interior portions by use of high-intensity infrared radiation.

GLASS AND GLASS-CERAMIC TREATING PROCESS

This invention is concerned with a process for producing opaque surface crystallized glass bodies for crystallizing glass to glass-ceramics, and for further crystallizing surface portions of transparent glass-ceramics to opaque glass-ceramics by use of high intensity infrared radiation.

The invention also includes glass or glass-ceramic bodies wherein the surface of a transparent glass-ceramic is crystallized to a different degree than interior portions by use of high-intensity infrared radiation.

Glass-ceramic and glass objects are widely used, for example, as cooking and eating utensils, mirror blanks, laboratory glassware, etc. In order to improve the physical properties of these objects, the glass-ceramic and glass material are often wholly or partially crystallized. This whole or partial crystallization effects desirable physical properties to the article in question, notably, that the coefficient of expansion is often reduced to a point where the objects are no longer hypersensitive to thermal shock. Likewise, the strength properties of the objects in question, after crystallization, are often improved.

In the prior art the desired article is formed from the glass-ceramic or glass material and subsequently crystallized by subsequent heat-treatment. Heat-treating processes as used in the prior art generally comprise the exposure of the article in question to a heat source such as that produced by an electrical resistance heater or gas flame. The overall exposure time generally range from about 60 minutes to about 5 days. Due to this extended exposure time, the heat in question has ample time to soak through the article in question, with the result that the article is crystallized throughout. These extended exposure times, as used in the prior art, are also disadvantageous in that they can slow up production.

In contrast with the prior art, the subject invention uses a very specific high-energy infrared heat source. The exposure times are reduced from a matter of hours to a matter of minutes. Due to the fact that the exposure time is minimized and a high-energy heat source is utilized, it is possible to selectively produce opaque or crystallized portions on the surface or throughout the body in question. The resulting body than can have an opaque crystallized outer layer and a nonopaque or amorphous center layer. This arrangement generally produces bodies of outstanding strength properties due to the fact that the outer layer is in compression. In the subject process, the body in question is heated so rapidly that the production of opaque crystallized portions occurs nearly immediately. Accordingly, opaque crystallized portions can be selectively formed on the surface only.

This invention can be applied to clear glasses which are, however, thermally crystallizable, as well as to glass-ceramic materials that have previously been crystallized to transparent glass-ceramics, but are nevertheless capable of conversion to opaque glass-ceramics by further heating; for example, see the type of crystallizable glasses disclosed in U.S. Pat. application, ser. No. 630,507, now abandoned filed Apr. 13, 1967. As is well known, a glass-ceramic is a semicrystalline material containing finely divided, randomly oriented crystals throughout the body formed by controlled thermal in situ crystallization of the glass. Glass-ceramics are to be distinguished from opal glasses which are still glasses having substantially the same viscosity characteristics as the original glass before it is opacified. A glass-ceramic does not have the viscosity characteristics of a glass even though it contains some glass; its annealing point temperature is at least 100° F. higher than the annealing point temperature of the original crystallizable glass because of the relatively high amount of crystals present. The annealing point temperature is the temperature at which the viscosity of the glass is $10^{13.4}$ poises, as determined by ASTM Designation C 336-54 T.

As is stated above, this invention can be used to treat both glasses and glass-ceramics. Examples of conversions which can be effected in accordance with this invention are the following:

1. The surface portion of glasses can be converted to an opaque state.
2. Opal glasses can be converted to an opal state throughout.
3. The surface portions of thermally crystallizable glasses can be converted to clear glass-ceramics.
4. The surface portions of thermally crystallizable glasses can be converted to opaque glass-ceramics.
5. Thermally crystallizable glasses can be converted throughout to crystalline clear glass-ceramics.
6. Thermally crystallizable glasses can be converted throughout to crystalline opaque glass-ceramics.
7. Clear glass-ceramics can have surface portions converted by further crystallization to opaque glass-ceramics.

The primary object of this invention is a process for producing crystallized glass-ceramic or glass bodies.

Still another object of this invention is a process for rapidly producing opaque crystallized glass-ceramic or glass objects.

Another object of this invention is a process for selectively producing opaque crystallized surface portions on glass-ceramic or glass bodies.

Still another object of this invention is to provide crystallized glass-ceramic or glass bodies in accordance with the process steps of this invention.

Finally, an object of this invention includes all the other novel features which will be obvious from the specification and claims at hand.

As is stated above, the subject invention is concerned with a process for producing crystallized glass-ceramic and glass bodies. Crystallization, in accordance with the process of this invention, is effected by selective exposure to a high intensity source of infrared radiation. The infrared radiation is absorbed into the article in question, with the result that very rapid heating is accomplished. The article in question is heated to the temperature at which opaque crystallized bodies are produced, thereby permitting the whole article or selective portions thereof to be converted to the opaque crystallized state.

The infrared radiation as used in this invention can have a wavelength range of from about 0.8 to about 2.5 microns. The more preferred range of the wavelength of the infrared radiation is from about 1.12 to about 1.5 microns. The most preferred radiation as used in accordance with this invention has a wavelength of about 1.12 microns. It is understood by one skilled in the art that the above wavelength ranges are not monochromatic but, instead, are the wavelengths at which the infrared energy peaks.

The power intensity of the infrared radiation can be from about 40 to about 1000 watts per linear inch per lamp. The more preferred power intensity is from about 60 to about 200 watts per linear inch per lamp. The most preferred power intensity is about 200 watts per linear inch per lamp.

Any conventional infrared energy source which is capable of meeting the above-described or higher power requirements can be used in this invention. A most convenient means for producing opaque crystallized bodies in accordance with this invention is by the utilization of a dual elliptical reflector clam shell infrared furnace. This furnace is capable of impinging all the infrared energy from two independent sources on a central point. Furnaces of this type are produced by Research, Incorporated, P.O. Box 6164, Minneapolis, Minn. 55424.

The exposure time for producing the crystallized articles in question can vary from about 45 seconds to about 30 minutes. A more preferred range of exposure time is from about 45 seconds to about 10 minutes, with the most preferred exposure time being about 70 seconds.

While the process of this invention can be used for purposes of forming opaque areas on the surface only, it is also within the scope of this invention to use the high-energy infrared heating process to effect crystallization throughout a thermally crystallizable glass. Since the high-energy radiation delivers heat to the surface of the body at a substantially higher rate than the absorbed heat can be conducted by the glass to the interior portions of the body, a progressively lower degree of heat treatment and consequent lower degree of in situ crystallization is effected, going from the surface to the interior. In thermally crystallizable glasses such as the present types, the glass-ceramic form has a lower coefficient of expansion than the glass, and the increased degree of crystallization of the surface portions of the body resulting form this embodiment, thus causes the surface to be in compression, greatly increasing the strength of the glass-ceramic body when compared to the usual glass-ceramic body having a uniform degree of crystallization throughout.

Accordingly, it is obvious to one skilled in the art that the exact exposure time is dependent on many variables, such as the degree to which crystallization is desired, the thickness and shape of the article in question, the temperature at which crystallization takes place in the article in question, the wavelength of radiation utilized, the power intensity of the radiation utilized, the absorption characteristics and composition of the glass-ceramic or glass material, etc. Considering the above variables, it may be necessary to program the energy input in order to compensate for the crystal growth desired. All the above discussed variables have to be correlated in such a way as to produce the desired degree of crystallization.

Examples of suitable glass-ceramic materials which can be used in the process of this invention are low expansion lithium aluminosilicate glass-ceramics, including magnesium lithium aluminosilicate, wherein titanium dioxide, zirconium dioxide, or a mixture of these, is used as a nucleating agent for the formation of crystals.

The subject process is capable of producing crystallized materials which have outstanding strength properties. These outstanding strength properties are imparted to the glass article in question by crystallization of the surface areas only to either a transparent or an opaque crystalline state. This surface crystallization forms a crystallized surface area which overlays an unopacified center portion. This selective crystallization creates a compressive layer on the outside of the article in question, with the result that the strength properties are greatly enhanced.

The following examples illustrate the subject invention. These examples are given for the purpose of illustration and not for the purpose of limiting this invention:

EXAMPLE I

A 12-inch section of a 3/16-inch diameter clear glass rod having the composition as listed in table II was placed in a dual elliptical infrared furnace and the applied voltage increased in steps in accordance with table I for a total exposure time of 20 minutes.

TABLE I

| % Volts (Input) (2 lamps) | Volts (input) (2 lamps) | Watts/lineal inch/lamp | Exposure time (min.) | Wavelength $\mu$ |
|---|---|---|---|---|
| 40 | 87 | 48.4 | 10 | 1.65 |
| 50 | 111 | 66.0 | 5 | 1.50 |
| 70 | 154 | 115.5 | 5 | 1.33 |

At the end of 20 minutes, the rod was completely opaque. The composition of the rod is listed in table II below:

TABLE II

PARTS BY WEIGHT

| | |
|---|---|
| $SiO_2$ | 68.8 |
| $Al_2O_3$ | 16.9 |
| MgO | 4 |
| $Li_2O$ | 3.5 |
| $ZrO_2$ | 1.4 |
| $TiO_2$ | 1.8 |
| $P_2O_5$ | 1.5 |
| F | 0.1 |
| $Na_2O$ | 0.6 |
| $Sb_2O_3$ | 0.4 |

The furnace used in examples 1 to 6 was a dual elliptical reflector infrared furnace manufactured by Research, Incorporated. It contains two high intensity General Electric quartz lamps. Each lamp draws approximately 9 amps at 220 volts. The current is controlled by a variable transformer which has graduations from 0 to 100. The amount of power drawn by the lamp at various settings is as follows. The infrared radiation produced at the specified wavelength is non monochromatic, but, instead, are the wavelengths at which the infrared energy peaks.

| Setting on Variac | Volts | Amps | Watts | Wavelength in Microns |
|---|---|---|---|---|
| 10 | 22 | 5 | 110 | 2.5 |
| 20 | 44 | 7 | 308 | 2.0 |
| 30 | 66 | 10 | 660 | 1.86 |
| 40 | 88 | 11 | 968 | 1.65 |
| 50 | 110 | 12 | 1320 | 1.50 |
| 60 | 132 | 14 | 1850 | 1.36 |
| 70 | 154 | 15 | 2310 | 1.33 |
| 80 | 175 | 16 | 2800 | 1.27 |
| 90 | 198 | 16.5 | 3170 | 1.20 |
| 100 | 220 | 17.5 | 3850 | 1.15 |

EXAMPLE 2

A rod as described in example 1 was treated in accordance with the procedure as listed in table III.

TABLE III

| % Volts (input) (2 lamps) | Volts (input) (2 lamps) | Watts/lineal inch/lamp | Exposure time (min.) | Wavelength $\mu$ |
|---|---|---|---|---|
| 45 | 88 | 50.7 | 5 | 1.58 |
| 55 | 121 | 76.5 | 5 | 1.45 |
| 65 | 143 | 101.7 | 5 | 1.34 |
| 75 | 165 | 128.0 | 1 | 1.29 |

At the end of 16 minutes' exposure time, the rod was opaque.

EXAMPLE 3

Again, a rod as described in example 1, was treated in accordance with table IV.

| % Volts (input) (2 lamps) | Volts (input) (2 lamps) | Watts/lineal inch/lamp | Exposure time (min.) | Wavelength $\mu$ |
|---|---|---|---|---|
| 45 | 88 | 50.7 | 5 | 1.58 |
| 55 | 121 | 76.5 | 5 | 1.45 |
| 65 | 143 | 101.7 | 5 | 1.34 |
| 75 | 165 | 128.0 | 5 | 1.29 |

Total exposure time—20 minutes; the rod was completely opaque at the end of this time period.

EXAMPLE 4

Using the rod and procedure of example 1, heat treatment was effected in accordance with table V.

TABLE V

| % Volts (input) (2 lamps) | Volts (input) (2 lamps) | Watts/lineal inch/lamp | Exposure time (min.) | Wavelength $\mu$ |
|---|---|---|---|---|
| 45 | 88 | 50.7 | 1 | 1.58 |
| 55 | 121 | 76.5 | 1 | 1.45 |
| 65 | 143 | 101.7 | 1 | 1.34 |
| 75 | 165 | 128.0 | 1 | 1.29 |

5 minutes total exposure time—Visual examination showed slight surface crystal growth.

EXAMPLE 5

A rod as described in example 1 was treated in accordance with table VI.

TABLE VI

| % Volts (input) (2 lamps) | Volts (input) (2 lamps) | Watts/lineal inch/lamp | Exposure time (min.) | Wavelength μ |
|---|---|---|---|---|
| 45 | 88 | 50.7 | 2 | 1.58 |
| 55 | 121 | 76.5 | 2 | 1.45 |
| 65 | 143 | 101.7 | 2 | 1.34 |
| 75 | 165 | 128.0 | 2 | 1.29 |

Again, slight crystal growth was visible on the surface.

EXAMPLE 6

The rod, as described in example 1, was treated in accordance with table VII:

TABLE VII

| % Volts (input) (2 lamps) | Volts (input) (2 lamps) | Watts/lineal inch/lamp | Exposure time (min.) | Wavelength μ |
|---|---|---|---|---|
| 75 | 165 | 128.0 | 5 | 1.29 |

Surface crystallization was evident on the sample at the end of the exposure time.

The modulus of rupture of the samples as prepared was tested in accordance with ASTM designation C–158. The data for this test is listed in table VIII, the test entitled "Flexure Testing of Glass."

TABLE VIII

| | Modulus of Rupture (p.s.i.) | | |
|---|---|---|---|
| | Average | Maximum | Minimum |
| Untreated Sample | 7900 | 7550 | 7025 |
| Treated Sample as described above by infrared exposure | 43,000 | 53,200 | 27,900 |
| Treated Sample as treated by conventional heat-treating process* | 21,500 | 25,700 | 19,600 |

*Sample heat-treated in accordance with table IX and cooled in the furnace.

TABLE IX

| Temperature °F. | Exposure Time (Hrs.) |
|---|---|
| 1300 | 2 |
| 1450 | 1 |
| 1500 | 1 |
| 1900 | 1 |

It is to be noted that the data of table VIII shows that the rod, as treated in accordance with this invention, has a modulus of rupture which is approximately twice as great as the rod treated in accordance with conventional procedures and approximately five times as great as the untreated rod.

Modifications may be resorted to within the spirit and scope of the appended claims.

What is claimed is:

1. A process for in situ crystallization of an article formed from thermally crystallizable glass or a transparent, partially crystallized glass capable of conversion to a more highly crystallized condition, comprising the steps of:
    exposing the surface of said article to a source of energy which consists essentially of infrared radiation having peak energy wavelengths in the wavelength range of from about 0.8 to about 2.5 microns for at least about 45 seconds,
    and continuing to emit said radiation at a power intensity level sufficient to initiate nucleation and obtain crystallization of said surface of said article.

2. A process as defined in claim 1 wherein only a surface layer of the article is thermally crystallized to thereby form a compressive stress layer in the surface portion of said article.

3. The process of claim 1, wherein the exposure time is from about 45 seconds to about 30 minutes.

4. The process of claim 1, wherein the glass is a lithium aluminosilicate glass-ceramic.

5. A process as defined in claim 1 wherein the body is formed of an aluminosilicate glass or glass ceramic.

6. A process for decorating an article formed of thermally crystallizable glass or transparent glass ceramic capable of conversion to a more highly crystallized condition according to a selected pattern of decoration comprising the steps of:
    exposing at least selected surface portions of said article to a source of energy consisting essentially of infrared radiation according to said pattern in a manner so that the radiation impinges on the surface of said article only in those selected surface portions permitted by the selected pattern of decoration, said radiation having peak energy wavelengths in the wavelength range of from about 0.8 to about 2.5 microns for at least 45 seconds,
    and continuing to emit said radiations at a power intensity level sufficient to initiate nucleation and obtain crystallization only in said selected surface portions according to the desired pattern to thereby opacify only said selected surface portions on said article according to the desired pattern of decoration while the remainder of the surface of the article remains transparent.

UNITED STATES PATENT OFFICE
CERTIFICATE OF CORRECTION

PATENT NO. : 3,615,317

DATED : October 26, 1971

INVENTOR(S) : Jagodzinski and Mansur

It is certified that error appears in the above-identified patent and that said Letters Patent are hereby corrected as shown below:

Col. 1, line 27, "range" should be --ranges--; line 40, "nonopaque" should be --non-opaque--. Col. 2, line 14, "glass-ceramic" should be --glass-ceramics--; line 14, delete "or" and insert therefor --and--; Col. 3, line 45, "table" should be --Table--; line 47, "table" should be --Table--; line 62, "table" should be --Table--. Col. 4, line 1, "examples" should be --Examples--; line 8, "wavelength" should be --wavelengths--; line 8, delete "non" and insert therefor --not--; line 27, "example" should be --Example--; line 28, "table" should be --Table--; line 46, "example" should be --Example--; line 47, "table" should be --Table--; line 63, "example" should be --Example--; line 64, "table" should be --Table--. Col. 5, line 5, "example" should be--Example--; line 6, "table" should be --Table--; line 23, "example" should be --Example--; line 24, "table" should be --Table--; line 40, "table" should be --Table--; line 50, change "7900" to --7550 --;line 50, "7500" should be --7900--; line 57, "table" should be --Table--; line 57, "furance" should be --furnace--. Col. 6, line 10, "table" should be --Table--.

Signed and Sealed this seventeenth Day of February 1976

[SEAL]

Attest:

RUTH C. MASON
*Attesting Officer*

C. MARSHALL DANN
*Commissioner of Patents and Trademarks*